United States Patent [19]

Murata et al.

[11] Patent Number: 4,950,630

[45] Date of Patent: * Aug. 21, 1990

[54] METHOD FOR PRODUCTION OF CATALYST COMPONENT FOR OLEFIN POLYMERIZATION

[75] Inventors: Masahide Murata; Masafumi Imai; Hiroyuki Furuhashi; Kouji Maruyama; Hiroshi Ueno, all of Saitama, Japan

[73] Assignee: Toa Nenryo Kogyo, K.K., Tokyo, Japan

[*] Notice: The portion of the term of this patent subsequent to Mar. 21, 2006 has been disclaimed.

[21] Appl. No.: 273,400

[22] Filed: Nov. 18, 1988

[30] Foreign Application Priority Data

Nov. 30, 1987 [JP] Japan .................. 62-300072

[51] Int. Cl.$^5$ ............................................. C08F 4/64
[52] U.S. Cl. ..................... 502/116; 502/141; 502/115; 502/121; 502/122; 502/123; 502/125; 502/127
[58] Field of Search ............... 502/111, 115, 116, 121, 502/122, 123, 125, 127

[56] References Cited

U.S. PATENT DOCUMENTS

| | | | |
|---|---|---|---|
| 3,953,414 | 4/1976 | Galli et al. | 252/429 C X |
| 4,111,835 | 2/1982 | Foschini et al. | 252/429 C X |
| 4,220,554 | 9/1980 | Scata et al. | 502/125 X |
| 4,311,817 | 1/1982 | Morita et al. | 526/124 |
| 4,315,835 | 2/1982 | Scata et al. | 502/125 X |
| 4,370,257 | 1/1983 | Imai et al. | 502/125 X |
| 4,814,312 | 3/1989 | Murata et al. | 502/125 X |

FOREIGN PATENT DOCUMENTS 0137694 4/1976 Japan .

*Primary Examiner*—Patrick P. Garvin
*Attorney, Agent, or Firm*—Myron B. Kurtzman; Michael E. Wilson

[57] ABSTRACT

A method for the production of a catalyst component for use in the polymerization of an olefin, which method comprises causing a magnesium-containing solid obtained by contact of (A) magnesium metal, (B) a halogenated hydrocarbon represented by the general formula, RX [wherein R stands for an alkyl, aryl, or cycloalkyl group having 1 to 20 carbon atoms and X stands for a halogen atom], and (C) a compound of the general formula, $X_n{}^1M(OR^1)_{m-n}$ [wherein $X^1$ stands for a hydrogen atom, a halogen atom, or a hydrocarbon group having 1 to 20 carbon atoms, M stands for a boron, carbon, aluminum, silicon, or phosphorus atom, $R^1$ stands for a hydrocarbon group having 1 to 20 carbon atoms, and m stands for the valency of said atom M, providing that $m > n \geq 0$ is satisfied], to contact (d) a halogen-containing alcohol and then contact (E) an electron donor type compound and (F) a titanium compound.

5 Claims, No Drawings

METHOD FOR PRODUCTION OF CATALYST COMPONENT FOR OLEFIN POLYMERIZATION

DESCRIPTION OF THE INVENTION

1. Field of the Invention

This invention relates to a method for the production of a catalyst component for use in the polymerization of an olefin, the titanium-containing catalyst component produced and the method of polymerizing olefins in the presence of the catalyst component.

2. Description of the Prior Art

A magnesium-carried (supported) catalyst having a transition metal component such as titanium deposited on a magnesium compound-containing carrier and intended for use in the polymerization of an olefin has been known to the art. More often than not in the preparation of the catalyst, the carrier therefore is used after it has been mechanically pulverized. In this case, the produced catalyst for polymerization and consequently the polymer obtained therewith consist of particles which are devoid of uniformity in shape.

Recently, a few attempts are being made to improve the shape of particles of a carrier. For example, a method which comprises converting an aqueous magnesium chloride solution or dissolved magnesium chloride hydrate ($MgCl_2.6H_2O$) through spray drying into spherical particles U.S. Pat. Nos. 3,953,414, 4,111,835, and 4,311,817, a method which comprises mutually contacting magnesium metal, a halogenated hydrocarbon, and an electron donor type compound such as an alcohol (Japanese Patent Application Disclosure SHO 51(1976)-64,586) a method which comprises causing an organic magnesium compound to react with an ester of orthosilicic acid, and a method which comprises causing magnesium metal, an ester of orthosilicic acid, and a halogenated hydrocarbon to react with one another U.S. Pat. Nos. 4,220,554 and 4,315,835 have been proposed. Indeed these methods are capable of improving the shapes of particles of a carrier and a catalyst to some extent. The catalysts produced, however, are not satisfactory in terms of activity.

The present inventors formerly found that a magnesium-containing solid consisting of particles uniform in shape and effectively serving as a carrier for an olefin polymerization catalyst is obtained by causing contact of magnesium metal, a halogenated hydrocarbon, and a compound of the general formula, $X_mC(OR)_{4-m}$ U.S. Pat. No. 4,370,257. They have consequently developed a catalyst component having an electron donor type compound and a titanium compound deposited on the aforementioned solid (Japanese Patent Applicatio Disclosure SHO 56(1981)-34,707). This catalyst, however, has an unsolved problem concerning the activity for polymerization.

PROBLEM FOR SOLUTION BY THE INVENTION

An object of this invention is to provide a catalyst component for the polymerization of an olefin, excelling in the quality of particles and exhibiting efficiency in polymerization on a practical level.

INVENTION FOR SOLUTION OF THE PROBLEM

After a diligent study, the present inventors have found that the object of this invention can be accomplished by providing a catalyst component which is obtained by causing a magnesium-containing solid produced by contact of the magnesium-containing solid disclosed in U.S. Pat. Nos. 4,370,257 and 4,220,554 mentioned above with a halogen-containing alcohol further to contact an electron donor type compound and a titanium compound. The present invention has been perfected as the result.

SUMMARY OF THE INVENTION

To be specific, the essence of the present invention resides in a method for the production of a catalyst component for use in the polymerization of an olefin, which method comprises causing a magnesium-containing solid obtained by contact of (A) magnesium metal, (B) a halogenated hydrocarbon represented by the general formula, RX [wherein R stands for an alkyl, aryl, or cycloalkyl group having 1 to 20 carbon atoms and X stands for a halogen atom], and (C) a compound of the general formula, $X_n^1M(OR^1)_{m-n}$ [wherein $X^1$ stands for a hydrogen atom, a halogen atom, or a hydrocarbon group having 1 to 20 carbon atoms, M stands for a boron, carbon, aluminum, silicon, or phosphorus atom, $R^1$ stands for a hydrocarbon group having 1 to 20 carbon atoms, and m stands for the valency of said atom M, providing that $m > n \leq 0$ is satisfied], to contact (D) a halogen-containing alcohol and then contact (E) an electron donor type compound and (F) a titanium compound.

RAW MATERIALS FOR PREPARATION OF CARRIER

(A) Magnesium Metal

Though this invention does not discriminate magnesium metal on account of its form, magnesium metal is used particularly advantageously herein in the form of powder or chips. Preparatorily to actual use, the magnesium metal is desirably washed with an inactive hydrocarbon such as, for example, a saturated aliphatic, alicyclic, or aromatic hydrocarbon having 6 to 8 carbon atoms and then dried by heating in the presence of an inactive gas such as nitrogen.

(B) Halogenated Hydrocarbon

Of the halogenated hydrocarbons represented by the general formula, RX, particularly desirable are chlorinated or brominated hydrocarbons containing as the substituent, R, an alkyl, aryl, or cyloalkyl group having 1 to 8 carbon atoms. To be concrete, such particularly desirable halogenated hydrocarbons include methyl, ethyl, isopropyl, n-butyl, n-octyl, and cyclohexyl chlorides and bromides, chlorobenzene, and o-chlorotoluene, for example.

(C) Compound of General Formula $X_n^1M(OR^1)_{m-n}$

In the formula, the symbols M, $X^1$, $R^1$, m and n have the same meanings as defined above. The substituent, $X^1$, may be a halogen-substituted hydrocarbon having 1 to 20 carbon atoms. Where $X^1$ is a hydrocarbon group, $X^1$ and $R^1$ may be the same or different. Hereinafter, the compounds of the aforementioned general formula will be referred to simply as "alkoxy compounds".

As examples of the hydrocarbon group, there can be cited alkyl groups such as methyl, ethyl, propyl, i-propyl, butyl, amyl, hexyl, octyl, 2-ethylhexyl, and decyl; cycloalkyl groups such as cyclopentyl, cyclohexyl, and methylcyclohexyl; alkenyl groups such as allyl, propenyl, and butynyl; aryl groups such as phenyl, tolyl, and xylyl; and aralkyl groups such as phenetyl and 3-phenylpropyl. Among other hydrocarbon groups enumerated above, alkyl groups of 1 to 10 carbon atoms prove to be particularly advantageous. Now, concrete examples of the alkoxy compounds will be cited below.

(1) Compounds using a carbon atom as the substituent, M

The compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OC_8H_{17})_4$; the compounds of the formula, $X^1C(OR^1)_3$, including $HC(OCH_3)_3$, $HC(OC_2H_5)_3$, $HC(OC_3H_7)(_3$, $HC(OC_4H_9)_3$, $HC(O-i-C_4H_9)_3$, $HC(OC_6H_{13}_3$, $HC(OC_8H_{17})_3$, $HC(OC_6H_5)_3$; $CH_3C(OCH_3)_3$, $CH_3C(OC_2H_5)_3$, $C_2H_5C(OCH_3)_3$, $C_2H_5(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9(OC_2H_4)_3$; $CH_2BrC(OC_2H_5)_3$, $CH_2ClC(OC_2H_5)_3$, $CH_3CHBrC(OC_2H_5)_3$, $CH_2CHCl(OC_2H_5)_3$; $ClC(OCH_3)_3$, $ClC(OC_2H_5)_3$, $ClC(OC_4H_7)_3$, $ClC(O-i-C_4H_9)_3$, $ClC(OC_8H_{17})_3$, $ClC(OC_6H_5)_3$, and $BrC(OC_2H_5)_3$; and the compounds of the formula, $X_2^1C(OR^1)_2$, including $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

(2) Compounds using a silicon atom as the substituent, M

The compounds of the formula, $Si(OR^1)_4$, including $Si(OCH_3)_4$, $Si(OC_2H_5)_4$, $Si(OC_4H_9)_4$, $Si(O-i-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; the compounds of the formula, $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_4)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$, $ClSi(OC_3H_7)_3$, $ClSi(OC_6H_5)_3$, and $BrSi(OC_2H_5)_3$; the compounds of the formula, $R_2Si(OR^1)_2$, including $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISi(OC_2H_5)_2$; and the compounds of the formula, $R_3SiOR^1$, including $(CH_3)_3SiOCH_3$, $(CH_3)_3SiOC_2H_5$, $(CH_3)_3SiOC_4H_9$, $(CH_3)_3SiOC_6$, $H_5$, $(C_2H_5)SiOC_2H_5$, and $(C_6H_5)_3SiOC_2H_5$.

(3) Compounds using a boron atom as the substituent, M

The compounds of the formula, $B(OR^1)_2$, including $B(OC_2H_5)_3$, $B(OC_4H_9)_3$, $B(OC_6H_{13})_3$, and $B(OC_6H_5)_3$.

(4) Compounds using an aluminum atom as the substituent, M

The compounds of the formula, $Al(OR^1)_3$, including $Al(OCH_3)_3$, $Al(OC_2H_5)_3$, $Al(OC_3H_7)_3$, $Al(O-i-C_3H_7)_3$, $Al(OC_4H_9)_3$, $Al(O-t-C_4H_9)_3$, $Al(OC_6H_{13})_3$, and $Al(OC_6H_5)_3$.

(5) Compounds using a phosphorus atom as the substituent, M

The compounds of the formula, $P(OR^1)_3$, including $P(OCH_3)_3$, $P(OC_2H_5)_3$, $P(OC_4H_9)_3$, $P(OC_6H_{13})_3$, and $P(OC_6H_5)_3$.

(D) Halogen-Containing Alcohol

The term "halogen-containing alcohol" as used in the present invention means a compound obtained from a monohydric or polyhydric alcohol possessing one or more hydroxyl groups in the molecular unit thereof by substituting a halogen atom for at least one freely selected hydrogen atom other than the hydrogen atom of the hydroxyl group. As examples of the halogen atom, there can be cited chlorine, bromine, iodine, and fluorine atoms. Among other halogen atoms cited above, the chlorine atom proves to be particularly advantageous.

As examples of the compound of the foregoing definition, there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzyhydrol, (m,o,p)-chlorobenzyl alcohol, 4-chlorocatechol, 4-chloro-(m,o)-cresol, 6-chloro-(m,o)-cresol, 4-chloro-3,5-dimethyl phenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenyl phenol, 6-chlorothymol, 4-chlororesorcinol, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromo-phenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol, α,α,α-trifluoro-m-cresol, 2,4,6-triiodophenol; 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol and tetrafluororesorcinol.

(E) Electron Donor Type Compound

As electron donor type compounds, there can be cited carboxylic acids, carboxylic anhydrides, carboxylic acid esters, carboxylic acid halogenides, alcohols, ethers, ketones, amines, amides, nitriles, aldehydes, alcoholates, phosphorus, arsenic, and antimony compounds coupled through the medium of carbon or oxygen with organic groups, phosphamides, thioethers, thioesters, and carbonic esters. Among other electron donor type compounds enumerated above, carboxylic acids, carboxylic anhydrides, carboxylic acid esters, carboxylic acid halogenides, alcohols, and ethers are used particularly advantageously.

As concrete examples of the carboxylic acids, there can be cited aliphatic monocarboxylic acids such as formic acid, acetic acid, propionic acid, butyric acid, isobutyric acid, valeric acid, caproic acid, pivalic acid, acrylic acid, methacrylic acid, and crotonic acid; aliphatic dicarboxylic acids such as malonic acid, succinic acid, glutaric acid, adipic acid, sebacic acid, maleic acid, and fumaric acid; aliphatic oxycarboxylic acids such as tartaric acid; alicyclic carboxylic acids such as cyclohexane monocarboxylic acid, cyclohexene monocarboxylic acid, cis-1,2-cyclohexane dicarboxylic acid, cis-4-methylcyclohexene-1,2-dicarboxylic acid; aromatic monocarboxylic acids such as benzoic acid, toluic acid, anisic acid, p-tert-butylbenzoic acid, naphthoic acid, and cinnamic acid; and aromatic polycarboxylic acids such as phthalic acid, isophthalic acid, terephthalic acid, naphthalic acid, trimellitic acid, hemimellitic acid, trimesic acid, pyromellitic acid, and mellitic acid.

As carboxylic anhydrides, the anhydrides of the carboxylic acids enumerated above can be used.

As carboxylic acid esters, the monoesters and polyesters of the carboxylic acids cited above can be used. As concrete examples of the carboxylic acid ester, there can be cited butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexne carboxylate, methyl benzoate, ethyl benzoate, methyl p-toluate, ethyl p-tert-butyl-benzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetraethyl pyromellitate, and tetrabutyl pyromellitate.

As carboxylic acid halogenides, the halogenides of the aforementioned carboxylic acids can be used. As concrete examples of the carboxylic acid halogenides, there can be cited acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, malonic acid chloride, malonic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexane carboxylic acid chloride, cyclohexanone carboxylic acid bromide, 1-cyclohexene carboxylic acid chloride, cis-4-methylcyclohexene carboxylic acid chloride, cis-4-methylcyclohexene carboxylic acid bromide, benzoyl chloride, benzoyl bromide, p-toluic acid chloride, p-toluic acid bromide, p-anisic acid chloride, p-anisic acid bromide, α-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Such monoalkyl halogenides of dicarboxylic acids as adipic acid monomethylchloride, maleic acid monoethylchloride, maleic acid monomethylchloride, and phthalic acid butylchloride can also be used.

The alcohols are represented by the general formula, ROH. In the formula, R stands for an alkyl, alkenyl, cycloalkyl, aryl, or aralkyl having 1 to 12 carbon atoms. Concrete examples of the alcohol include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-tert-butylphenol, and n-octylphenol. The ethers are represented by the general formula, $ROR^1$. In the formula, R and $R^1$ independently stand for an alkyl, alkenyl, cycloalkyl, aryl, or aralkyl having 1 to 12 carbon atoms. R and $R^1$ may be equal or unequal. Concrete examples of the ether include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisole, and ethylphenyl ether. Any compound selected from the aforementioned halogen-containing alcohols can be also used.

(F) Titanium Compound

The term "titanium compound" as used herein means a compound of divalent, trivalent, or tetravalent titanium. As concrete examples of the titanium compound, there can be cited titanium tetrachloride, titanium tetrabromide, trichloroethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds cited above, such tetravalent titanium halogenides as titanium tetrachloride, trichloroethoxy titanium, dichlorodibutoxy titanium, and dichlorodiphenoxy titanium prove to be particularly desirable, titanium tetrachloride being the most desirable choice.

Procedure for Preparation of Catalyst Component

The catalyst component according to the present invention is obtained by placing magnesium metal, a halogenated hydrocarbon, and an alkoxy compound into mutual contact thereby producing a magnesium-containing solid, allowing a halogen-containing alcohol (Component D) to come into contact with the magnesium-containing solid, and then allowing an electron donor type compound (Component E) and a titanium compound (Component F) further to come into contact therewith.

(1) Contact among magnesium, halogenated hydrocarbon, and alkoxy compound

The method for establishing contact among the three components is not specifically limited. Virtually any method can be adopted for this contact. The contact can be accomplished, for example, by (1) a method which comprises simultaneously placing the three components into mutual contact, (2) a method which comprises preparatorily allowing magnesium metal to come into contact with the halogenated hydrocarbon and subsequently allowing the product of this contact or a compound obtained in advance by the contact of the two components, such as, for example, any of the compounds represented by the formulas, $ClMgCH_3$, $ClMgC_2H_5$, $ClMgC_3H_7$, $ClMgC_4H_9$, $ClMg-i-C_4H_9$, $ClMgC_6H_{13}$, $ClMgC_8H_{17}$, $BrMgC_2H_5$, $BrMgC_4H_9$, $BrMg-i-C_4H_9$, $IMgC_4H_9$, $ClMgC_6H_5$, and $BrMgC_6H_5$, which are known as Grignard reagents, to come into contact with the alkoxy compund, (3) a method which comprises suspending magnesium metal in a solution of the alkoxy compound and adding a solution of the halogenated hydrocarbon to the resultant suspension, or (4) a method which comprises placing the alkoxy compound and the halogenated hydrocarbon into mutual contact and subsequently adding magnesium metal to the product of the contact, for example.

It is also possible that the contacting of the three components mentioned above may be accomplished in the presence of a small amount of Grignard reagent in the reaction system.

The ratio of the amounts of the alkoxy compound and magnesium metal to be used is desired to be such that the number of $OR^1$ groups in the alkoxy compund per magnesium atom in the magnesium metal exceeds 1, or preferably falls in the range of 3 to 5. In the case of an alkoxy compound represented by the formula, $X_2^1C(OR^1)_2$, for example, the amount of the alkoxy compound is desired to exceed 0.5 mol, or preferably falls in the range of 1.5 to 2.5 mols, per gram atom of magnesium. In the case of an alkoxy compound represented by the formula, $X^1C(OR^1)_3$, the amount of the alkoxy compund is desired to exceed ⅓ mol, or preferably falls in the range of 1 to 5/3 mols, per gram atom of magnesium. The amount of the halogenated hydrocarbon to be used is desired to fall in the range of 1 to 2 mols, per gram atom of magnesium.

The contact reaction of the foregoing description is accomplished by stirring the combined components under such conditions that the contact temperature falls in the range of 0° C. to 250° C., preferably 30° C. to 120° C., and the contact time falls in the range of 0.5 to 10 hours. This reaction may be carried out, where desired, in the presence of the same inactive hydrocarbon such as, for example, an aliphatic, alicyclic, or aromatic hydrocarbon having 6 to 8 carbon atoms, as used in the drying of magnesium metal. The reaction should preferably be performed in the presence of an ether to increase the reaction efficiency. Examples of the ether that can be used include diethyl ether, diisopropyl ether, dibutyl ether, diisobutyl ether, diisoamyl ether, di-2-ethylhexyl ether, diallyl ether, diphenyl ether, and anisole.

It is permissible, for the purpose of promoting this reaction, to use iodine, an alkyl iodide, or an inorganic halide such as calcium chloride, copper chloride, manganese chloride, or a hydrogen halogenide.

The solid product prepared by the reaction described above is subsequently brought into contact with a halogen-containing alcohol. This contact may be accomplished by simply adding the alcohol to the reaction system in which the previous reaction has been performed. Alternatively, prior to the contact with the alcohol, the solid product may be removed from the reaction system and cleaned with a suitable cleaning agent such as the aforementioned inactive hydrocarbon. The cleaned product may be dried according to need.

(2) Contact with halogen-containing alcohol

The magnesium-containing solid obtained in (1) in brought into contact with a halogen-containing alcohol (Component D). This contact may be accomplished by mixing and stirring the two components in the presence of an inactive medium. Examples of the inactive medium include hydrocarbons such as pentane, hexane, heptane, octane, decane, cyclohexane, benzene, toluene, and xylene; and halogenated hydrocarbons such as 1,2-dichloroethane, 1,2-dichloropropane, carbon tetrachloride, butyl chloride, isoamyl chloride, bromobenzene, and chlorotoluene.

The contact of the two components is usually carried out at a temperature in the range of −20° C. to +150° C. for a period in the range of 0.1 to 100 hours. Where the contacting evolves heat, the following procedure may be employed. At first, the two components are slowly brought into contact with each other at a low temperature. After the two components have been entirely mixed with each other, the temperature is raised, and the two components are kept in contact with each other at the raised temperature.

The amount of Component D to be used is generally in the range of 0.05 to 20 gram mols, preferably 0.1 to 10 gram mols, per gram atom of magnesium in the solid.

The solid product which is obtained by the contact of the aforementioned solid with Component D is destined to undergo the subsequent contact. It may be washed, when necessary, with the aforementioned inactive medium prior to the contact.

(3) Contact with electron donor type compound and titanium compound

The contact of the solid product mentioned above with the electron donor type compound (Component E) and the titanium compund (Component F) can be effected by (1) a method which comprises bringing the solid product into contact first with Component E and then with Component F, (2) a method which comprises bringing the solid product into contact first with Component F and then with Component E, or (3) a method which comprises bringing the solid product into contact with Component E and Component F all at once.

Each of the contacts mentioned above is accomplished by combining and stirring the relevant components in the presence or absence of an inactive medium. As the inactive medium, any of the aforementioned compounds can be used.

The contact of the magnesium-containing solid product with Component E and Component F is carried out generally at a temperature in the range of 0° C. to 200° C. for a period in the range of 0.5 to 20 hours. The amount of Component E to be used is in the range of 0.005 to 10 gram mols, preferably 0.01 to 1 gram mol, per gram atom of magnesium in the solid product. The amount of Component F to be used is required to exceed 0.1 gram mol, preferably to fall in the range of 1 to 50 gram mols, per gram atom of magnesium in the solid product.

The contact of the solid product with Component F may be carried out two or ore times as occasion demands. The contact can be effected by any of the methods described above. The product of the first contact may be washed, as required, with an inactive medium and mixed anew with Component F (and the medium) for contact.

By the procedure described above, the catalyst component according to the present invention can be produced. This catalyst component, when necessary, may be washed with such a hydrocarbon as hexane, heptane, octane, cyclohexane, benzene, toluene, or xylene and may further be dried as occasion demands.

The catalyst component according to the present invention possesses a quality such that the specific surface area measured by the BET method at the adsorption temperature of liquefied nitrogen falls in the range of 10 to 1,000 m$^2$/g, the pore volume is in the range of 0.05 to 5 cm$^3$/g, the particle size distribution is narrow, and the particles are uniform. The percentage composition of the catalyst component is such that the magnesium content is 1 to 25% by weight, the titanium content is 0.5 to 10% by weight, and the chlorine content is 4 to 80% by weight.

Catalyst for Polymerization of Olefin

The catalyst component obtained by the present invention is combined with an organic compound of a metal from Groups I through III of the Periodic Table of Elements to produce a catalyst for use in the homopolymerization of an olefin or the copolymerization of one olefin with another olefin.

Organic Compound of Metal from Groups I Through III

As the organic metal compound, there can be used any of the organic compounds of lithium, magnesium, calcium, zinc, and aluminum. Among other organic metal compounds cited above, organic aluminum compounds prove to be particularly suitable. The organic aluminum compounds which are usable herein are those represented by the general formula $R_nAlX_{3-n}$ (wherein R stands for an alkyl group or aryl group, X stands for a halogen atom, an alkoxy group, or a hydrogen atom, and n stands for a number in the range of $1 \leq n \leq 3$). For example, alkyl aluminum compounds having 1 to 18 carbon atoms, preferably 2 to 6 carbon atoms, such as trialkykl aluminum, dialkyl aluminum monohalide, monoalkyl aluminum dihalide, alkyl aluminum sesquihalide, dialkyl aluminum monoalkoxide, and dialkyl aluminum monohydride, mixtures of such alkyl aluminum compound, and complexes thereof prove to be particularly desirable. As concrete examples of the alkyl aluminum compounds, there can be cited trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, methyl aluminum dibromide, ethyl aluminum dibromide, ethyl aluminum diiodide, and isobutyl aluminum dichloride; alkyl aluminum sesquihalide such as ethyl aluminum sesquihalide; dialkyl aluminum monoalkoxide such as dimethyl aluminum ethoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such a dimethyl aluminum hydride, diethyl aluminum hydride, dipropyl aluminum hydride, and diisobutyl aluminum hydride. Among other organic aluminum compounds cited above, trialkyl aluminum, particularly triethyl aluminum and triisobutyl aluminum, prove to be particularly desirable. Such a trialkyl aluminum can be used in combination with some other readily commercially available aluminum organic compound such as, for example, diethyl aluminum chloride, ethyl aluminum dichloride, ethyl aluminum sesquichloride, diethyl aluminum ethoxide, or diethyl aluminum hydride, or a mixture thereof, or a complex thereof.

An organic aluminum compound of the kind having two or more aluminum atoms coupled through the medium of an oxygen atom or a nitrogen atom can be also used. As examples of the compound of this description, there can be cited $(C_2H_5)_2AlOAl(C_2H_5)_2$, $(C_4H_9)_2AlOAl(C_4H_9)_2$, and

Organic compounds of metals other than aluminum metal include diethyl magnesium, ethyl magnesium chloride, diethyl zinc, $LiAl(C_2H_5)_4$, and $LiAl(C_7H_{15})_4$, for example.

Though the organic metal compound can be used by itself, it may be used in combination with the electron donor type compound. As the electron donor type compound, any of the compounds cited previously as examples of the compounds usable as Component (E) for the preparation of the catalyst component can be used. Otherwise, the electron donor type compound may be selected from those electron donor type compound formed of organic silicon compounds and those electron donor type compounds containing a hetero atom such as nitrogen, sulfur, oxygen, or phosphorus.

As concrete examples of the organic silicon compound, there can be cited tetramethoxy silane, tetraethoxy silane, tetrabutoxy silane, tetraisobutoxy silane, etraphenoxy silane, tetra(p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl tributoxy silane, butyl triphenoxy silane, isobutyl triisobutoxy silane, vinyl triethoxy silane, allyl trimetrhoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropyl silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibutoxy silane, dibutyl diphenoxy sialne, diisobutyl diethoxy silane, diisobutyl diisobutoxy silane, diphenyl dimethoxy silane, diphenyl diethoxy silane, diphenyl dibutoxy silane, dibenzyl diethoxy silane, diviyl diphenoxy silane, diallyl dipropoxy silane, diphenyl diallyloxy silane, methylphenyl dimethoxy silane, and chlorophenyl diethoxy silane.

As concrete examples of the electron donor type compound containing a hetero atom, there can be cited nitrogen atom-containing compounds such as 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzamide, 2-methylpyrolle, 2,5-dimethylpyrrole, imidazole, toluamide, benzonitrile, acetonitrile, aniline, para-toluidine, orthotoluidine, meta-toluidine, triethylamine, diethylamin, dibutylamine, tetramethylenediaine, and tributylamine; sulfur atom-containing compound such as thiophenol, thiophene, ethyl 2-thiopheneycarboxylate, ethyl 3-thiophenecarboxylate, 2-methylthiophene, methyl mercaptan, isopropyl mercaptan, butyl mercaptan, diethyl thioether, diphenyl thioether, methyl benzenesulfonate, methyl sulfite, and ethyl sulfite; oxygen atom-containing compounds such as tetrahydrofuran, 2-methyltetrahydrofuran, 3-methyltetrahydrofuran, dioxane, dimethyl ether, diethyl ether, dibutyl ether, diisoamyl ether, diphenyl ether, anisole, acetophenone, acetone, methyl ethyl ketone, acetylacetone, ethyl 2-furalate, isoamyl 2-furalate, methyl 2-furalate, and propyl 2-furalate; and phosphorus atom-containing compounds such as triphenylphosphine, tributylphosphine, triphenyl phosphite, tribenzyl phosphite, diethyl phosphate, and diphenyl phosphate.

Two or more such electron donor type compounds may be used in a combined state. The electron donor type compound of this description may be used when the organic metal compound and the catalyst component are used in combination or it may be used after it has been brought into contact with the organic metal compound in advance.

The amount of the organic metal compound to be used in combination with the catalyst component according to the present invention is generally in the range of 1 to 2,000 gram mols, preferably 25 to 500 gram mols, per gram atom of titanium in the catalyst component.

The ratio of the amounts of the organic metal compound and the electron donor type compound is so selected that the amount of the organic metal compound as aluminum falls in the range of 0.1 to 40 gram atoms, preferably 1 to 25 gram atoms, per mol of the electron donor type compound.

POLYMERIZATION OF OLEFIN

The catalyst which is composed of the catalyst component obtained as described above and the organic metal compound (and the electron donor type compound) is useful as a catalyst for the homopolymerization of a monoolefin having 2 to 10carbon atoms or for the copolymerization of the monoolefin with another monoolefin or a diolefin having 3 to 10 carbon atoms. It exhibits highly desirable performance as a catalyst particularly for the homopolymerization of an α-olefin having 3 to 6 carbon atoms such as, for example, propylene, 1-butene, 4-methyl-1-pentene, or 1-hexene, or the random or block copolymerization between two such α-olefins as mentioned above or between such an α-olefin and ethylene.

The polymerization reaction can be carried out effectively in a gas phase or a liquid phase. In the liquid phase, the polymerization can be carried out in an inactive hydrocarbon such as n-butane, isobutane, n-pentane, isopentane, hexane, heptane, octane, cyclohexane, benzene, toluene, or xylene and a liquid monomer. The polymerization temperature is generally in the range of −80° C. to +150° C, preferably 40° C. to 120° C. The polymerization pressure is sufficient in the range of 1 to 60 atmospheres. The control of the molecular weight of the polymer to be obtained is effected by carrying out the polymerization in the presence of hydrogen or some other known molecular weight modifier. In the copolymerization, the amount of the comonomeric olefin given to be copolymerized with the main olefin is generally up to 30% by weight, preferaly in the range of 0.3 to 15% by weight. The polymerization reaction by the use of the catalyst system of the present invention can be carried out continuously or batchwise under the conditions normally adopted for any polymerization. The copolymerization reaction may be carried out in a single stage or in two or more stages.

Effect of the Invention

The catalysts component to be obtained by the present invention functions effectively as a catalyst component in the production of a polyolefin, particularly isotactic polypropylene, a random copolymer of ethylene with propylene, or a block copolymer of ethylene with propylene.

The polymerization catalyst which uses the catalyst component according to the present invention possesses high polymerization activity and high stereoregularity and the olefin polymer powder to be obtained possesses a high bulk density. Further, this polymer powder abounds in flowability.

EXAMPLE

Now, the present invention will be described more specifically below with the reference to examples and applied examples. Wherever the term "percent (%)" is used in these examples, it shall be construed as meaning a percent by weight unless otherwise specified.

The PSDI of the catalyst component was determined by measuring the particle size distribution of a sample with a particle sizer, a product of Malvern Corp. marketed under trademark designation of "MALVERN 3600", and carrying out a calculation of the following formula using the results of the measurement.

$PSDI = \log (A/B)$ where A is the particle diameter of particles accounting for 90% of the cumulative weight, and B is the particle diameter of particles accounting for 10% of the cumulative weight.

The heptane insoluble content indicating the proportion of crystalline polymer in the polymer (hereinafter referred to simply as "HI") represents the amount of residue after 6 hours extraction of a sample with boiling n-heptane in a modified Soxhlet extractor. The melt flow rate (MFR) was determined in accordance with the method defined in ASTM D1238. The bulk density was determined by Method A defined in ASTM D1895-69.

The particle distribution of the polymer was measured with the standard sieve specified by W. S. Tyler Corp. The PSDI value consequently found was reported as the index of the particle size distribution.

EXAMPLE 1

Preparation of Magnesium-Containing Solid

In a reaction vessel provided with a reflux condenser and having an inner volume of 1 liter, 12.8 g (0.53 mol) of magnesium metal chips (purity 99.5%) and average particle diameter 1.6 mm) and 250 ml of n-hexane were placed under atmosphere of nitrogen gas and stirred at 68° C. for one hour. Then, the magnesium metal was taken out of the resultant mixture and dried at 65° C. under a vacuum to obtain preactivated magnesium metal.

Subsequently, a suspension obtained by adding to the magnesium metal 88 ml (0.53 mol) of ethyl ortho-formate [HC(OC$_2$H$_5$)$_3$] and 0.5 ml of a methyl iodide solution of 10% of iodine as a promoter was held at 55° C. The suspension and a 5-ml portion of a solution of 80 ml (0.8 mol) of n-butyl chloride in 100 ml of n-hexane added dropwise thereto were stirred for 50 minutes. Then, the remainder of the aforementioned solution was added dropwise thereto over a period of 80 minutes. The resultant combined liquid was stirred at 70° C. for 4 hours to undergo a reaction. Consequently, there was obtained a solid reaction product.

This reaction product was washed six times each with 300 ml of n-hexane at 50° C. and dried under a vacuum at 60° C. for 1 hour, to recover 55.6 g of white powdery magnesium-containing solid. The solid was found to contain 22.5% of magnesium and 34.0% of chlorine.

Contact with 2,2,2-Trichloroethanol

In a reaction vessel provided with a reflux condenser, a stirrer, and a dropping funnel and having an inner volume of 300 ml, 6.3 g of the magnesium-containing solid and 50 ml of n-heptane were placed under an atmosphere of nitrogen gas to form a suspension. This suspension was kept stirred at room temperature and a mixed solution of 2.0 ml (0.02 mmol) of 2,2,2-trichloroethanol and 11 ml of n-heptane was added to the suspension through the dropping funnel over a period of 30 minutes. The resultant combined liquid was stirred at 80° C. for one hour. The solid consequently formed in the stirred liquid was separated by filtration, washed four times each with 100 ml of n-hexane at room temperature and further washed two times each with 100 ml of toluene, to produce a solid component.

Contact with Titanium Tetrachloride and Di-n-Butyl Phthalate

To the solid component mentioned above, 40 ml of toluene was added and titanium tetrachloride was added in an amount calculated to give a volumetric titanium tetrachloride/toluene ratio of 3/2. The resultant combined liquid was heated to 90° C. The hot mixture was kept stirred and a mixed solution of 2 ml of di-n-butyl phthalate and 5 ml of toluene was added dropwise to the hot mixture over a period of 5 minutes. The resultant mixture was stirred at 120° C. for 2 hours. The solid product consequently obtained in the mixture was separated by filtration and washed at 90° C. two times each with 100 ml of toluene. Further, the washed solid product and titanium tetrachloride added thereto in an amount calculated to give a volumetric titanium tetrachloride/toluene ratio of 3/2 were stirred at 120° C. for 2 hours. The solid substance consequently formed therein was separated by filtration at 110° C. and washed seven times each with 100 ml of n-hexane at room temperature, to obtain 5.5 g of a catalyst component.

This catalyst component was found to have a specific surface area of 293 m$^2$/g and contain 1.95% of titanium, 24.1% of magnesium, and 70.8% of chlorine. The average particle diameter of this catalyst component was 23 μm and the PSDI thereof was 0.31.

EXAMPLE 2

Preparation of Magnesium-Containing Solid

By following the procedure of Example 1, 8.3 g of magnesium metal was activated. Then, a suspension obtained by adding to the magnesium metal 140 ml of n-butyl ether and 0.5 ml of methyl iodide solution of 10% of iodine was kept at 55° C. To the suspension, a solution of 38.5 ml of n-butyl chloride in 50 ml of n-butyl ether was added dropwise over a period of 50 minutes. The resultant combined liquid was stirred at 70° C. for 4 hours to undergo a reaction. The reaction solution was kept at 55° C.

Then, 55.7 ml of HC(OC$_2$H$_5$)$_3$ was added dropwise to the reaction solution over a period of 1 hour. At this time, a solid was observed to form therein. After the dropwise addition was completed, the reaction mixture was left reacting at 60° C. for 15 minutes. The solid resulting from the reaction was washed six times each with 300 ml of n-hexane and dried under a vacuum at room temperature for 1 hour, to recover 31.6 g of a magnesium-containing solid having a magnesium content of 19.0% and a chlorine content of 28.9%.

Contact with 2,2,2-Trichloroethanol

A solid component was obtained by following the procedure of Example 1, excepting 6.3 g of the magnesium-containing solid obtained as described above was used instead.

Contact with Titanium Tetrachloride and Di-n-butyl Phthalate

Contact with titanium tetrachloride and di-n-butyl phthalate was effected by following the procedure of Example 1, excepting the solid component obtained as described above was used instead. Consequently, there was produced a catalyst component having a specific surface area of 285 m$^2$/g, a titanium content of 2.01%, a magnesium content of 24.2%, a chlorine content of 71.0%, an average particle diameter of 22 μm, and a PSDI value of 0.32.

EXAMPLES 3 THROUGH 8

Catalyst components possessing the compositions and physical properties indicated below were obtained by following the procedure of Example 1, excepting the varying alkoxy compounds indicated below were used in the plae of HC(OC$_2$H$_5$)$_3$.

| Example No. | Alkoxy compound | Titanium content (%) | Ave. particle diameter (μm) | PSDI |
|---|---|---|---|---|
| 3 | CH$_2$CH(OC$_2$H$_5$)$_2$ | 2.1 | 29 | 0.38 |
| 4 | C(OC$_2$H$_5$)$_4$ | 1.9 | 17 | 0.45 |
| 5 | Si(OC$_2$H$_5$)$_4$ | 2.5 | 7 | 0.32 |
| 6 | Al(OC$_2$H$_5$)$_3$ | 1.7 | 13 | 0.40 |
| 7 | B(OC$_2$H$_5$)$_3$ | 2.4 | 18 | 0.37 |
| 8 | P(OC$_2$H$_5$)$_3$ | 2.3 | 17 | 0.36 |

EXAMPLES 9 THROUGH 12

Catalyst components possessing the compositions and physical properties indicated below were obtained by following the procedure of Example 1, excepting the halogen-containing alcohols indicated below were used in the place of 2,2,2-trichloroethanol.

| Example No. | Halogen-containing alcohol | Titanium content (%) | Ave. particle diameter (μm) | PSDI |
|---|---|---|---|---|
| 9 | 1,1,1-Trichloro-2-propanol | 2.7 | 27 | 0.39 |
| 10 | 2,2-Dichloroethanol | 3.0 | 21 | 0.40 |
| 11 | p-Chlorophenol | 2.1 | 24 | 0.41 |
| 12 | 1-Bromo-2-butanol | 2.5 | 26 | 0.50 |

EXAMPLES 13 THROUGH 15

Catalyst components possessing the compositions and physical properties indicated below were obtained by following the procedure of Example 1, excepting the amount of 2,2,2-trichloroethanol (TCE) was varied as indicated below.

| Example No. | Amount of TCE used | Titanium content (%) | Ave. particle diameter (μm) | PSDI |
|---|---|---|---|---|
| 13 | 1 | 1.7 | 23 | 0.38 |
| 14 | 4 | 2.8 | 29 | 0.46 |
| 15 | 6 | 3.3 | 31 | 0.53 |

EXAMPLES 16 AND 17

Catalyst components possessing the compositions and physical properties indicated below were obtained by following the procedure of Example 1, excepting the electron donor type compounds indicated below were used in the place of di-n-butyl phthalate.

| Example No. | Electron donor type compound | Titanium content (%) | Ave. particle diameter (μm) | PSDI |
|---|---|---|---|---|
| 16 | Ethyl benzoate | 1.9 | 22 | 0.32 |
| 17 | p-Cresol | 2.2 | 23 | 0.32 |

EXAMPLE 18

The same procedure as in Example 1 was repeated to activate 8.3 g of metallic magnesium. To the activated metallic magnesium were added 140 ml of n-butyl ether and 2 ml of ClMgN-C$_4$H$_9$ solution in n-butyl ether (1.75 mol/liter). To the resulting suspension, which was kept at 60° C., was further added dropwise over 50 minutes a solution containing 38.5 ml of n-butyl chloride dissolved in 50 ml of n-butyl ether. The reactants were stirred at 70° C. for 1.5 hours during reaction. The reaction liquid was kept at 23° C.

Subsequently, to the reaction liquid was added dropwise 55.7 ml of HC(OC$_2$H$_5$) over 30 minutes. The reactants were kept at 23° C. for 30 minutes, and then heated to 50° C. over 1 hour. The reactants were kept at 50° C. for 1 hour, and then heated to 80° C. over 1 hour. The reactants were kept at 80° C. for 2 hours, during which reaction proceeded to give a solid reaction product. It was washed with six 300-ml portions of n-hexane at 60° C., followed by drying at room temperature under reduced pressure. Thus there was obtained 38.9 g of magnesium-containing solid.

The thus obtained magnesium-containing solid (6.3 g) was brought into contact with 2,2,2-trichloroethanol in the same manner as in Example 1. The contact product was further brought into contact with titanium tetrachloride and di-n-butyl phthalate in the same manner as in Example 1 except that the amount of di-n-butyl phthalate was changed to 3 ml. Thus there was obtained a catalyst component containing 1.87% of titanium, 24.3% of magnesium, and 70.6% of chlorine. The catalyst component was found to have a specific surface area of 308 m$^2$/g, a pore volume of 0.31 cm$^3$/g, an average particle diameter of 23 μm, and a PSDI value of 0.32.

EXAMPLE 19

The same procedure as in Example 18 was repeated to react metallic magnesium with n-butyl chloride and HC(OC$_2$H$_5$)$_3$. The reaction liquid was cooled to 25° C. To the reaction liquid was added dropwise 9.8 ml of 2,2,2-trichloroethanol over 30 minutes, with the solid reaction product not separated. The reactants were kept at 80° C. for 1 hour, during which reaction proceeded to give a solid reaction product. It was brought into contact with titanium tetrachloride and di-n-butyl phthalate in the same manner as in Example 18. Thus there was obtained a catalyst component containing 1.87% of titanium, 24.3% of magnesium, and 69.8% of chlorine. The catalyst component was found to have a specific surface area of 247 m$^2$/g, a pore volume of 0.39 cm$^3$/g, an average particle diameter of 20 μm, and a PSDI value of 0.52.

EXAMPLE 20

The same procedure as in Example 19 was repeated with the following exceptions. After the reaction with HC(OC$_2$H$_5$)$_3$, the reaction liquid was cooled to 25° C. and allowed to stand. The supernatant liquid (n-butyl ether) was removed and then 250 ml of n-heptane was added. The reaction product was brought into contact with 2,2,2-trichloroethanol. The contact product was further brought into contact with titanium tetrachloride and di-n-butyl phthalate in the same manner as in Example 18. Thus there was obtained a catalyst component containing 1.93% of titanium, 24.3% of magnesium, and 70.3% of chlorine. The catalyst component was found to have a specific surface area of 246 m$^2$/g, a pore volume of 0.32 cm$^3$/g, an average particle diameter of 24 μm, and a PSDI value of 0.45.

COMPARATIVE EXAMPLE 1

A catalyst component was obtained by following the procedure of Example 1, excepting the contact with 2,2,2-trichloroethanol was omitted. This catalyst component had a titanium content of 1.3%, an average particle diameter of 17 μm, and a PSDI value of 0.38.

COMPARATIVE EXAMPLE 2

A catalyst component was obtained by following the procedure of Example 5, excepting the contact with 2,2,2-trichloroethanol was omitted. This catalyst component had a titanium content of 3.3%, an average particle diameter of 6 μm, and a PSDI value of 0.32.

APPLIED EXAMPLE 1

Under an atmosphere of nitrogen gas, 11.1 mg of the catalyst component obtained in Example 1, 4 ml of a solution containing 0.1 mol of triethyl aluminum (hereinafter referred to as "TEAL") per liter of n-heptane, and 1 ml of a solution containing 0.04 mol of phenyltriethoxysilane (hereinafter referred to as "PES") per liter of n-heptane were mixed and the resultant mixture was held at rest for 5 minutes. The mixture thus obtained was placed in a stainless steel autoclave provided with a stirrer and having an inner volume of 1.5 liters. Then, 300 ml of hydrogen gas as a molecular weight regulting agent and 1 liter of liquefied propylene were compressed into the autoclave. The reaction system thus prepared was heated to 70° C. and kept at this temperature for 1 hour to effect polymerization of propylene. After the polymerization was completed, the system was purged of unaltered propylene to obtain 229 g of a white polypropylene powder having an HI value of 97.0%, an MFR value of 7.1 g/10 minutes, and a bulk density of 0.40 g/cm$^3$ [Kc (amount of produced polymer in gram per gram of catalyst component)=20,600]. The particle size distribution (cumulative value) of the produced polymer was as follows:

| Less than 149 μm | 0% | 420~590 μm | 28.3% |
|---|---|---|---|
| 149~250 μm | 0.10% | 590~840 μm | 86.3% |
| 250~350 μm | 0.34% | 840~1000 μm | 94.5% |
| 350~420 μm | 0.97% | 1000~1680 μm | 99.8% |
|  |  | Over 1680 μm | 100% |

The PSDI value of the polymer was 0.27.

APPLIED EXAMPLES 2 THROUGH 22

Polymerization of propylene was carried out in the same manner as in Applied Example 1, except that the catalyst component obtained in Example 1 was replaced by those obtained in Examples 2 to 20 and Comparative Examples 1 and 2. In addition, the amount of the PES solution (which was used at the time of propylene polymerization) was changed to 2 ml in Applied Examples 18 to 20. The results are as follows:

| Applied Example | Catalyst component | Kc (g/g-cat) | HI (%) | MFR (g/10 min) | Bulk density (g/cm$^3$) | PSDI |
|---|---|---|---|---|---|---|
| 2 | Example 2 | 20700 | 97.2 | 5.1 | 0.40 | 0.27 |
| 3 | Example 3 | 17600 | 96.3 | 4.8 | 0.40 | 0.36 |
| 4 | Example 4 | 18600 | 96.8 | 5.3 | 0.39 | 0.40 |
| 5 | Example 5 | 19000 | 95.5 | 6.2 | 0.41 | 0.30 |
| 6 | Example 6 | 15300 | 95.7 | 7.3 | 0.38 | 0.37 |
| 7 | Example 7 | 15900 | 96.2 | 6.6 | 0.38 | 0.35 |
| 8 | Example 8 | 15500 | 96.3 | 6.4 | 0.40 | 0.34 |
| 9 | Example 9 | 17200 | 97.1 | 5.7 | 0.36 | 0.35 |
| 10 | Example 10 | 18100 | 96.8 | 5.1 | 0.38 | 0.40 |
| 11 | Example 11 | 19900 | 97.0 | 5.3 | 0.39 | 0.39 |
| 12 | Example 12 | 16400 | 96.9 | 4.6 | 0.39 | 0.39 |
| 13 | Example 13 | 19200 | 97.0 | 6.2 | 0.40 | 0.35 |
| 14 | Example 14 | 20700 | 96.5 | 6.3 | 0.41 | 0.40 |
| 15 | Example 15 | 18800 | 96.3 | 5.8 | 0.39 | 0.52 |
| 16 | Example 16 | 11800 | 95.3 | 7.2 | 0.37 | 0.30 |
| 17 | Example 17 | 14500 | 95.7 | 5.2 | 0.38 | 0.31 |
| 18 | Example 18 | 21700 | 92.7 | 5.6 | 0.40 | 0.27 |
| 19 | Example 19 | 16000 | 97.4 | 5.3 | 0.40 | 0.45 |
| 20 | Example 20 | 17200 | 97.0 | 5.5 | 0.40 | 0.45 |
| 21 | Comparative Example 1 | 15200 | 97.0 | 5.7 | 0.32 | 0.65 |
| 22 | Comparative Example 2 | 9200 | 95.4 | 4.9 | 0.39 | 0.30 |

APPLIED EXAMPLES 23 AND 24

Polymerization of propylene was carried out in the same manner as in Applied Example 1 except that the phenyltriethoxysilane was replaced by ethyl benzoate (in Applied Example 23) or 2,2,5,5-tetramethylenepiperidine (in Applied Example 24). The results are as follows:

| Applied Example | Kc (g/g-cat) | HI (%) | MFR (g/10 min) | Bulk density (g/cm$^3$) | PSDI |
|---|---|---|---|---|---|
| 23 | 12400 | 95.2 | 8.1 | 0.37 | 0.32 |
| 24 | 10800 | 96.1 | 6.2 | 0.39 | 0.32 |

APPLIED EXAMPLES 25 AND 26

Polymerization of propylene was carried out in the same manner as in Applied Example 18 except that the PES solution was replaced by the combination of a PES solution and a 0.04 mol/l solution of ethyl benzoate in n-butane as shown below.

| Applied Example | PES solution (ml) | Ethyl benzoate solution (ml) |
|---|---|---|
| 25 | 1.6 | 0.4 |
| 26 | 0.8 | 1.2 |

The results are as follows:

| Applied Example | Kc (g/g-cat) | HI (%) | MFR (g/10 min) | Bulk density (g/cm$^3$) | PSDI |
|---|---|---|---|---|---|
| 25 | 17600 | 96.5 | 5.3 | 0.40 | 0.29 |
| 26 | 14900 | 96.0 | 6.2 | 0.41 | 0.30 |

We claim:

1. A titanium-containing olefin polymerization catalyst component obtained by contacting,
   I. a magnesium-containing carrier obtained by
   (i) first contacting (A) magnesium metal with (B) a halogenated hydrocarbon represented by the general formula, RX wherein R stands for an alkyl, aryl, or cycloalkyl group having 1 to 20 carbon atoms and X stands for a halogen atom, and
   (ii) thereafter the contact product therefrom contacted with a (C) an alkoxy compound of the general formula, $X_n{}^1M(OR^1)_{m-n}$ wherein $X^1$ stands for a hydrogen atom, a halogen atom, or a hydrocarbon group having 1 to 20 carbon atoms, M stands for a boron, carbon, aluminum, silicon, or a phosphorus atom, $R^1$ stands for a hydrocarbon group having 1 to 20 carbon atoms, and m stands for the valency of said atom M, providing that $m > n \geq 0$ is satisfied, and contacting the product therefrom with (D) a halogen-containing alcohol with
   II. (E) an electron donor compound and (F) a titanium compound.

2. The titanium-containing component in accordance with claim 1 wherein the (A) magnesium metal, (B) halogenated hydrocarbon and (C) alkoxy compound are contacted simultaneously and the contact product therefrom contacted with (D) the halogen-containing alcohol and the contact product therefrom contacted with (E) electron donor compound and (F) a titanium compound.

3. The titanium-containing component in accordance with claim 1 wherein the halogen-containing alcohol is employed in the range of 0.05 to 20 gram mols per gram atom of magnesium in the solid.

4. The titanium-containing component in accordance with claim 1 wherein the surface area is in the range of 10 to 1000 m$^2$g, and the pore volume is in the range of 0.05 to 5 cm$^3$/g.

5. A catalyst system for the polymerization of olefins comprising the titanium-containing component of claim 1 and an organometallic cocatalyst wherein the metal is from Groups I through III of the Periodic Table.

* * * * *